United States Patent
Wood

(10) Patent No.: US 7,380,445 B2
(45) Date of Patent: Jun. 3, 2008

(54) TURBOCHARGER PERFORMANCE QUALIFICATION METHOD AND APPARATUS

(75) Inventor: Terry G. Wood, Countryside, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 153 days.

(21) Appl. No.: 11/427,880

(22) Filed: Jun. 30, 2006

(65) Prior Publication Data

US 2008/0011070 A1  Jan. 17, 2008

(51) Int. Cl.
*G01M 19/00* (2006.01)
(52) U.S. Cl. .......................... 73/118.1; 73/116
(58) Field of Classification Search ........ 73/116–118.1
See application file for complete search history.

(56) References Cited

U.S. PATENT DOCUMENTS

| 6,178,748 | B1 * | 1/2001 | Oleksiewicz | 60/602 |
| 6,457,461 | B1 * | 10/2002 | Romzek | 123/568.16 |
| 6,681,575 | B2 * | 1/2004 | Dellora et al. | 60/624 |
| 7,165,403 | B2 * | 1/2007 | Sun et al. | 60/612 |

\* cited by examiner

*Primary Examiner*—Eric S. McCall
*Assistant Examiner*—Jermaine Jenkins
(74) *Attorney, Agent, or Firm*—Jeffrey P. Calfa; Gerald W. Askew

(57) ABSTRACT

A method for qualifying turbocharger performance includes the step of operating a turbocharger at a single test condition (402). A set of data may be acquired from a set of operating parameters of the turbocharger (404) operating at the test condition. The set of data acquired may be compared to a set of operating ranges (406) that are deemed acceptable, and a determination may be made as to whether the set of data falls within the acceptable operating ranges (408). Performance of the turbocharger may then be qualified (412, 414) based on an outcome of the determination (410).

12 Claims, 4 Drawing Sheets

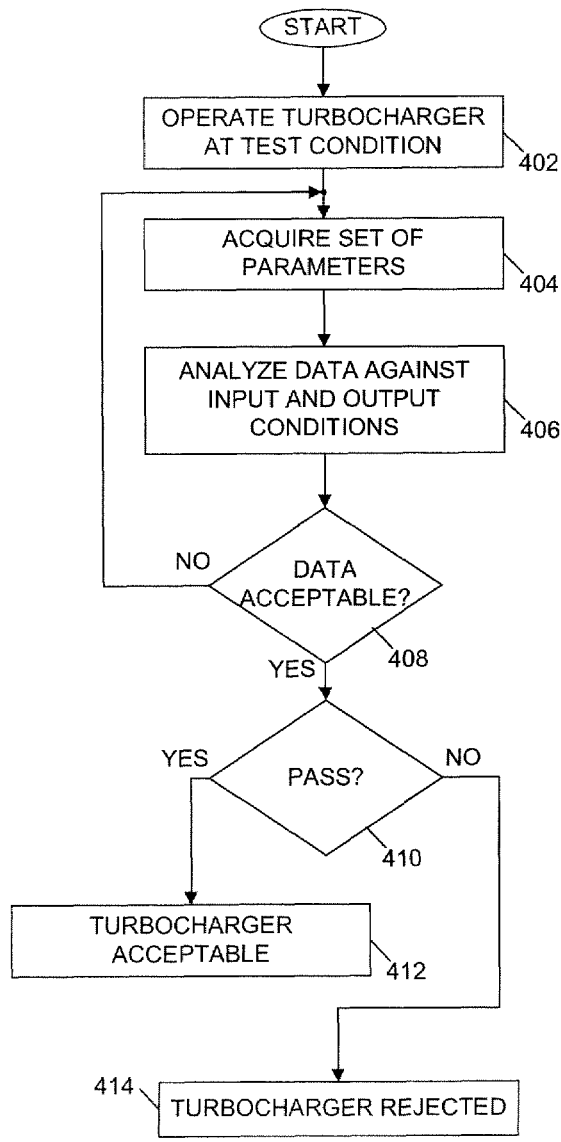
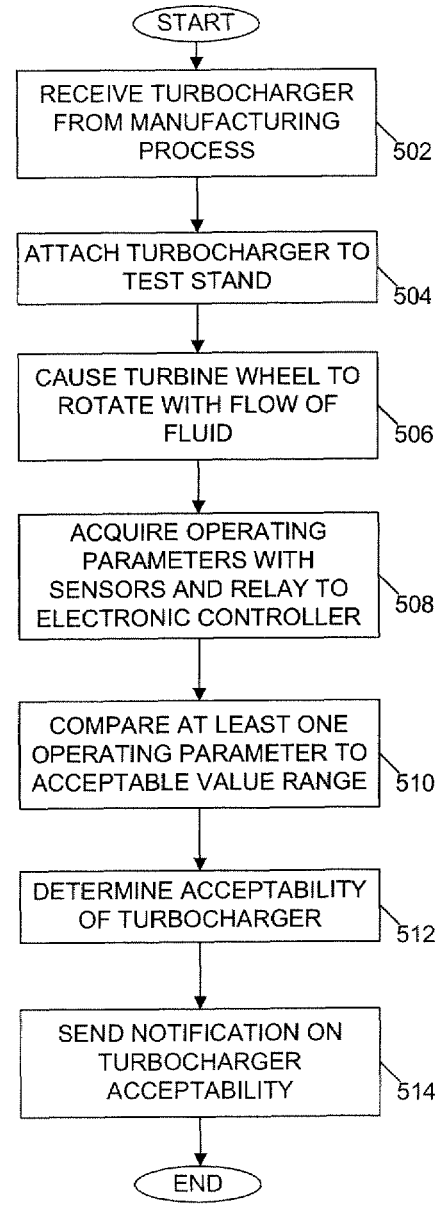
FIG. 4
FIG. 5

TURBOCHARGER PERFORMANCE QUALIFICATION METHOD AND APPARATUS

FIELD OF THE INVENTION

This invention relates to internal combustion engines, including but not limited to characterization of engine components, specifically, characterization of turbocharger performance.

BACKGROUND OF THE INVENTION

There are numerous instances when a performance of a turbocharger may require qualification. For example, newly manufactured turbocharger units may require a performance test at the manufacturer' facility, or another facility, for a determination of whether there are any performance defects, or whether the turbochargers conform to their functional specifications. In other instances, turbochargers that have undergone a remanufacturing or reconditioning process may also require testing to qualify their performance. In yet other instances, turbocharger performance may require qualification in a service or testing environment as part of an engine troubleshooting process. In any of these instances, various performance parameters of a sample turbocharger unit may be acquired through testing and analyzed.

Techniques previously used for turbocharger performance qualification have included acquisition of various data points within an operational range of a turbocharger for the compilation of a turbine or compressor map, i.e., two dimensional plots of curves representing turbine or compressor performance plotted against a mass flow through the turbine or compressor versus a pressure ratio across the turbine or compressor. Typically, a map is a collection of 20-70 individual running data points that are connected to form curves of constant shaft speed and surge. With interpolation, islands of efficiency are plotted over the curves. These turbine or compressor maps are typically overlaid over what is considered a typical map, to yield a determination of adequacy of a device's performance through visual observation and estimation of the overlay. Interpretation of the results is subjective and does not provide reasonable data to check individual turbo performance.

Such techniques are not practical to implement in a production environment, and even if spot checking is made on sample pieces of a production line, the performance qualification of a turbocharger or one of its components is incomplete and may also be inaccurate as it is based on a visual determination. Moreover, these known techniques are data intensive in compiling the performance maps, time intensive, and costly to implement.

Accordingly, there is a need for an improved method of qualifying performance for turbochargers, that is accurate, does not depend on a subjective determination, and that does not require vast amounts of data to be collected.

SUMMARY OF THE INVENTION

A method for qualifying turbocharger performance that is accurate, does not depend on a subjective determination, and that does not require vast amounts of data to be collected includes the step of operating a turbocharger at a single test condition. A set of data may be acquired from a set of operating parameters of the turbocharger operating at the test condition. The set of data acquired may be compared to a set of operating ranges that are deemed acceptable, and a determination may be made as to whether the set of data falls within the acceptable operating ranges. Performance of the turbocharger may then be qualified based on an outcome of the determination.

In one embodiment, a turbocharger may be operated on an engine at a test condition as part of an engine system. A set of inputs to the system that includes a fuel consumption rate of the engine system may be monitored during the test. A set of outputs from the system that includes a compressor outlet pressure of the turbocharger may also be monitored. The set of outputs may be compared to a set of respective acceptable ranges, and a finding of acceptable performance of the turbocharger may be made when the set of outputs is within the set of respective acceptable ranges.

A test station for qualifying turbocharger performance in a manufacturing or remanufacturing environment and may include a test fixture having a turbocharger mounting apparatus attached thereon, an electronic controller associated therewith, a plurality of sensors that are disposed to measure operating parameters of the test station and are operably connected to the test station, and a fluid pump arranged and constructed to fluidly connect to a turbocharger at times when the turbocharger is connected to the test fixture with the mounting apparatus, such that a fluid pump outlet is connected to a turbine inlet passage.

BRIEF DESCRIPTION OF THE DRAWINGS

FIG. 4 is a flowchart for a method of analytically qualifying turbocharger performance in accordance with the invention.

FIG. 5 is a flowchart for a method of graphically qualifying turbocharger performance in accordance with the invention.

DESCRIPTION OF A PREFERRED EMBODIMENT

The following describes an apparatus for and method of qualifying the performance of turbochargers. Some of the examples described herein deal with methods for qualifying turbochargers or individual components thereof for use on internal combustion engines, but these methods advantageously have general applicability to any type of turbine and/or compressor devices used on other applications.

Figure 1:
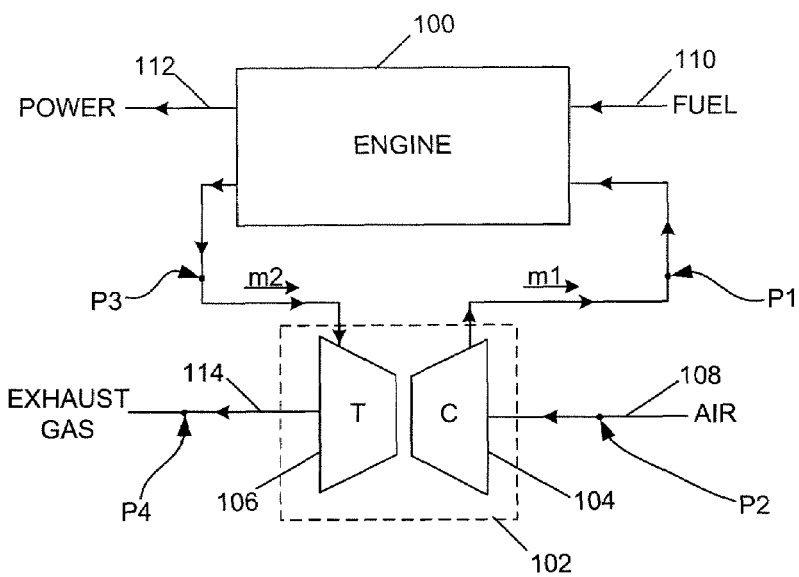
FIG. 1 is a block diagram of an engine having a turbocharger associated therewith.

A typical configuration of an engine 100 having a turbocharger 102 associated therewith is shown in block diagram form in FIG. 1. The turbocharger 102 may include a compressor 104 connected to a turbine 106 as is known. A flow of air 108 may enter the compressor 104 during operation of the turbocharger 102, where it is compressed. A flow of compressed air, along with a flow of fuel 110, may enter the engine 100 where the two flows may be mixed and combusted to yield a power output 112 of the engine 100. A flow of exhaust gas may exit the engine 100 and be routed to the turbine 106, where it may be expanded to provide work thereto to operate the compressor 104 before being expelled to the environment as a flow of low pressure exhaust gas 114. During operation of the engine 100 and the turbocharger 102 and for a specific operation condition, the flow of air 108 may have a mass flow rate, m1, at a compressor outlet pressure, P1, and a compressor inlet pressure, P2. Similarly, the flow of exhaust gas 114 may have a mass flow rate, m2, and be at a pressure, P3, at the inlet of the turbine 106, and at a pressure, P4, at the outlet of the turbine 106. When, for example, qualification of the performance of the compressor 104 is desired, the mass flow m1 along with the pressures P1 and P2 may be acquired for a range of operating conditions of the engine 100, and plotted on a compressor map. Typically, data for more than one compressor may be overlaid onto a compressor map of a nominal compressor.

Figure 2:
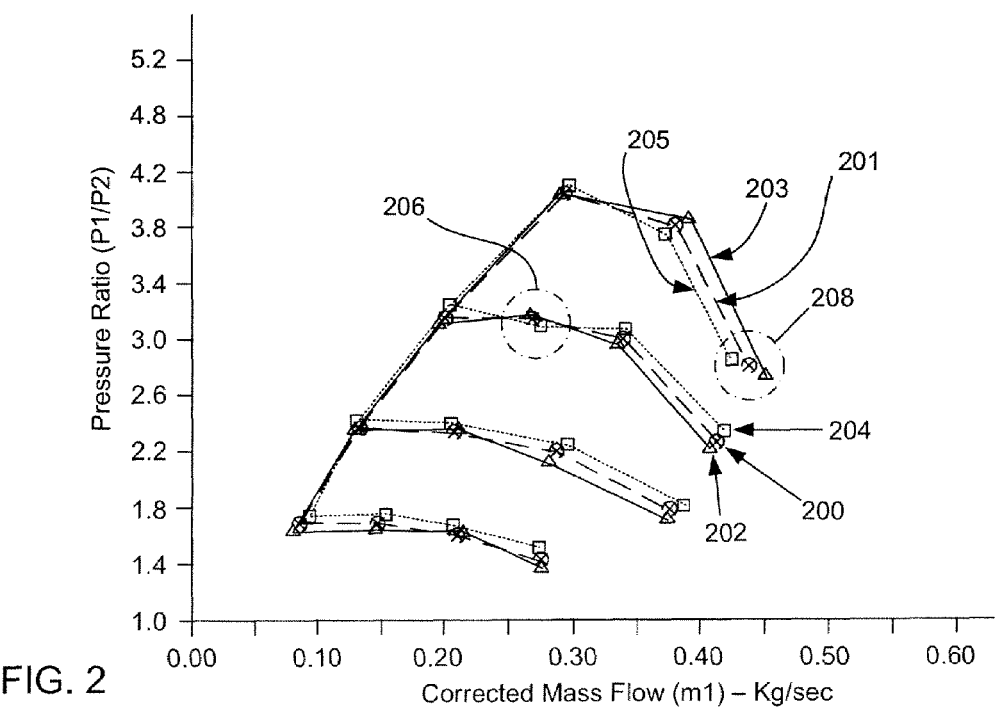
FIG. 2 is a graph containing overlaid data for multiple turbochargers.

A typical compressor map overlay that is similar to a map overlay typically used to qualify the performance of a compressor or a turbine is shown in FIG. 2. The compressor map overlay shown in FIG. 2 includes a set of data points, represented by crossed-circle points 200 and connected by long-dashed lines 201, which represent a performance of a nominal compressor. Overlaid thereon is a second set of points, represented by triangles 202 and connected by solid lines 203, which represent a performance of a second compressor that is not the nominal compressor, and a third set of points, represented by squares 204 and connected by short-dashed lines 205, which represent a performance of a third compressor that is also not the nominal compressor. There are only 15 total test points represented in this graph for each compressor, for the sake of clarity, although a typical map overlay may include 20-70 total test points for each compressor being evaluated.

The series of points 200, 202, and 204, are acquired under similar operating conditions. A visual determination on the performance of each compressor tested typically involves a determination on the spread of each of the points 200, 202, and 204. Under some conditions, groupings of points may be closely associated to each other, for example, a grouping 206. The points within the grouping 206 may be closely associated to each other enough to warrant a determination that the performance of each of the compressors that yielded those points is satisfactory when compared to the nominal compressor. Under some other conditions, though, groupings of points on the same overlay may not be closely associated to each other, for example a grouping 208.

The points within the grouping 208 may be spread apart enough to warrant a determination that the performance of each of the compressors that yielded those points is not satisfactory when compared to the nominal compressor. In a case similar to the one shown groupings similar to the groupings 206 and 208 appear on the same overlay, a subjective overall determination as to the performance of each compressor tested may be made. As described above, such a determination is data intensive, time consuming, costly, and may not conclusively determine acceptability of a compressor being tested because it is based on the subjective judgment of the person reviewing the data. Moreover, a qualification of a turbocharger unit depends on the separate determinations made individually for the compressor and turbine that make up each turbocharger, further removing the determination comparison between the performance of the entire turbocharger unit from that of a nominal turbocharger.

Figure 3:
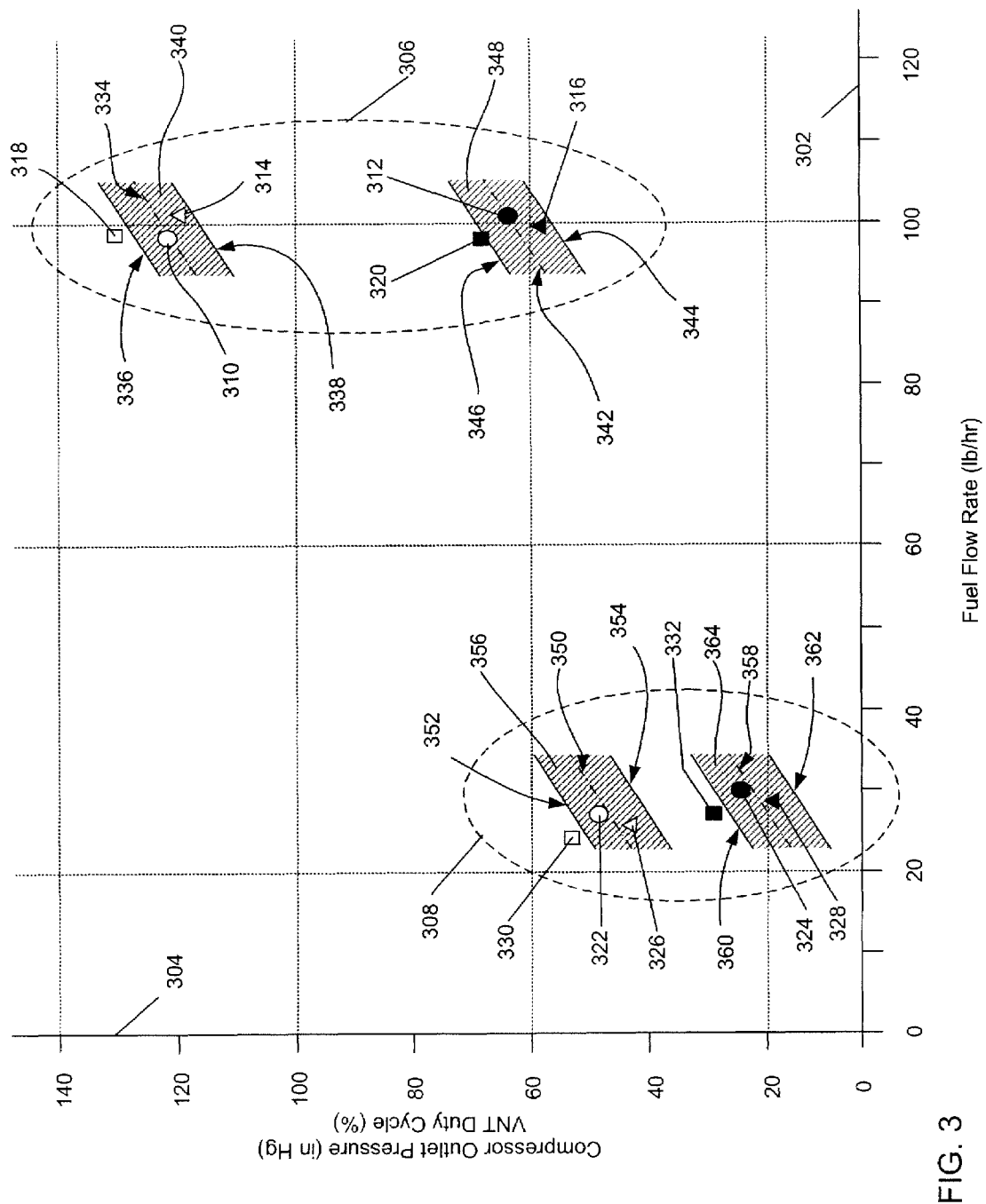
FIG. 3 is a graph for plotting information relating to a qualification determination of multiple turbochargers in accordance with the invention.

These issues and others may be addressed by the method of qualifying the performance of a turbocharger as described herein. A graph showing an alternative and improved method of objectively determining performance acceptability of not only a single turbocharger component, but advantageously determining performance acceptability of an entire turbocharger unit, is shown in FIG. 3. A horizontal axis 302 represents an energy input parameter into a system. In the example described here, an entire engine may be considered as the system, and a rate of fuel consumption, in lbs/hr, may be considered as the energy input thereto. Of course other combinations may be considered, for example, the turbocharger unit may be the system for a bench test, or an enthalpy input may be calculated and considered as the energy input. Other hardware combinations or energy parameters may be used. A selection of the hardware and parameters used for this consideration may depend largely on the purpose of the qualification, for example, an engine manufacturer interested in testing engine systems while monitoring fuel consumption may use the same or similar parameters as those used to compile the graph shown in FIG. 3, i.e., a fuel flow rate on the horizontal axis 302 versus a vertical axis 304 that may be used to express combined values, in this case, a compressor outlet pressure and a variable nozzle turbine (VNT) percent duty cycle.

The parameters selected for quantification and plotting purposes are representative of an engine's controllable inputs and outputs. For example, a controlled input to a compression ignition engine is a throttle position that determines a rate of fuel consumption and therefore an engine speed. Spark ignition engines operate in a similar fashion, but instead of a fueling, an airflow into the engine that operates under a substantially constant air to fuel ratio may be controlled to control engine speed by use of a throttle valve. One output that may be monitored on an engine that is indicative of turbocharger performance is compressor outlet pressure, which is also plotted on the graph of FIG. 3, although other parameters may also be used. Finally, the VNT duty cycle, as a controllable variable input to the engine system, may also be plotted on the graph of FIG. 3, but is optional and may be assumed fixed for each experimental testing condition. In general, the engine system is viewed as a complete system, with input parameters of fuel and air entering the system, and a flow of exhaust gas and power exiting the system as outputs.

The data plotted in the graph of FIG. 3 is representative of one method of qualifying the performance of turbocharger units. Data on one or more turbocharger units may be acquired for a first test condition 306 and a second test condition 308. Each of the test conditions 306 and 308 may be a single steady state point of engine operation, and may be selected as points that are representative of engine operation for optimization of performance and/or emissions. In the example shown here for illustration, the test condition 306 and/or the test condition 308 may advantageously be selected from a series of standard heavy-duty emissions testing mode points. The test condition 306 may be arranged to attain and engine speed of 2100 revolutions per minute (RPM) at a fuel consumption rate of about 100 lb/hr (45.5 Kg/hr) to represent a medium to high load condition, while the test condition 308 may be arranged to attain about and engine speed of about 1000 RPM at a fuel consumption rate of about 28 lb/hr (13 Kg/hr) to represent a low to medium load condition. Any other points of engine operation may advantageously be selected.

In the example shown, data for a first, second, and third turbochargers that have been tested on the same or on advantageously different engines are acquired and plotted. Information on the first turbocharger is plotted using a hollow circle point 310 for the compressor's outlet pressure, and a filled-in circle 312 for a duty cycle for the variable nozzle turbine (VNT) setting during the test. The points 310 and 312, as plotted, represent a boost pressure of about 124 in Hg (420 kPa) at a VNT duty cycle of about 70%. Similarly, data on a second turbocharger is plotted using a hollow triangle point 314 for the compressor's outlet pressure, and a filled-in triangle 316 for a VNT duty cycle setting during the test. The points 314 and 316, as plotted, represent a boost pressure of about 120 inHg (406 kPa) at a VNT duty cycle of about 70%. Lastly, data on the third turbocharger is plotted using a hollow square point 318 for the compressor's outlet pressure, and a filled-in square 320 for a VNT duty cycle setting during the test. The points 318 and 320, as plotted, represent a boost pressure of about 130 inHg (440 kPa) at a VNT duty cycle of about 70%.

Data may be plotted for the test condition 308 in a similar fashion and using the same plotting shapes as data plotted for the test condition 306. Hence, point 322 may represent a boost pressure and point 324 may represent the VNT duty of the first turbocharger, point 326 may represent a boost pressure and point 328 may represent the VNT duty of the second turbocharger, and finally point 330 may represent a boost pressure and point 332 may represent the VNT duty of the third turbocharger.

The data points 310-332 may advantageously be relied on for a complete qualification of each of the first, second, and third turbochargers being evaluated. This qualification may be made using known nominal and threshold ranges for all values of interest being plotted. In the graph of FIG. 3, the parameters selected to be of interest are compressor outlet pressure (boost) and VNT duty cycle. Each of these parameters may have a nominal range and allowable offsets of each of the testing conditions being plotted. A nominal boost range for the test condition 306 is represented by the dash-dot-dash line 334. The line 334 may be arranged to represent a limited range of operating conditions to allow for minor adjustments to the desired fueling rate of the engine during testing, and may be slightly slanted to accommodate expected differences in output, in this case boost values, as a result of variations in an input parameter, in this case, engine fueling rate. The line 334 may be used to generate a band defined by an upper limit line 336, and a lower limit line 338. The upper limit 336 and lower limit 338 lines may follow the nominal line 334. An area 340 is shown shaded and defined between the upper limit line 336, the lower limit line 338, and vertical lines that coincide with each end of the nominal line 334, may be used for a qualification of the boost generated by a turbocharger being tested.

Points falling within the area 340 may advantageously represent turbochargers with acceptable performance characteristics, while points falling outside the area 340 may represent turbochargers falling above or below a desired performance characteristic range, i.e. turbochargers failing to pass a qualification determination.

Similar to the area 340, other areas may be considered around other nominal lines characterizing other parameters and/or testing conditions. For instance, a nominal line 342 may be defined as a nominal line representing an acceptable testing range for the VNT duty cycle. An upper limit line 344 and a lower limit line 346 may define an area 348 as described above. Based on the exemplary data shown for the first test condition 306, a performance of the first turbocharger as inferred by points 310 and 312 falling within the areas 340 and 348 respectively, indicates that the first turbocharger has an acceptable performance in the first testing condition. A performance of the second turbocharger as inferred by points 314 and 316 falling within the areas 340 and 348 respectively, indicates that the second turbocharger is a little further than the nominal values than the first turbocharger, but still has an acceptable performance in the first testing condition. The third turbocharger, however, having point 320 falling partly outside area 348, and point 318 falling completely outside area 340, is unacceptable and should be rejected or reworked.

A complete determination on the acceptability of a turbocharger may be made based on a single set of data at a test condition. If there are more than one test conditions of interest, one can advantageously use multiple test points, each configured in a similar fashion, for example, the second test condition 308 shown in FIG. 3. A nominal boost range for the test condition 308 is represented by the dash-dot-dash line 350. The line 350 may be used to generate a band defined by an upper limit line 352, and a lower limit line 354. The upper limit 352 and lower limit 354 lines may follow the nominal line 350. An area 356 is shown shaded and defined between the upper limit line 352, the lower limit line 354, and vertical lines that coincide with each end of the nominal line 350, may be used for a qualification of the boost generated by a turbocharger being tested.

Points falling within the area 356, for example points 322 and 326, may advantageously represent turbochargers with acceptable performance characteristics, while points falling outside the area 340, for example point 330, may represent turbochargers falling above or below a desired performance characteristic range, i.e. turbochargers failing to successfully pass a qualification determination.

A nominal line 358 may be defined as a nominal line representing an acceptable testing range for the VNT duty cycle under the test condition 308. An upper limit line 360 and a lower limit line 362 may define an area 364 as described above. Based on the exemplary data shown for the test condition 308, a performance of the first turbocharger as inferred by points 322 and 326 falling within the areas 356 and 364 respectively, indicates that the first turbocharger has an acceptable performance. A performance of the second turbocharger as inferred by points 326 and 328 falling within the areas 356 and 364, respectively, indicates that the second turbocharger has an acceptable performance. The third turbocharger, however, having points 330 and 332 falling completely outside of the areas 356 and 364 respectively, is unacceptable and should be rejected or reworked.

A flowchart for a method of qualifying turbocharger performance is shown in FIG. 4. A turbocharger is operated at a test condition at step 402. The operation of the turbocharger at this step may advantageously be performed using any method suitable, for example, operation on an engine in a vehicle or connected to a dynamometer, operation on a gas stand, or operation at an assembly line station. During operation of the turbocharger at the test condition, a set of parameters is acquired at step 404. These parameters, or data, may optionally include input parameters to a system, such as air and/or fuel consumption of an engine, energy content or enthalpy of gas being supplied to the turbocharger by an engine or a gas stand, and so forth. Output parameters may also be measured, for example, an energy content or enthalpy of an outlet gas of the turbocharger, a pressure and/or flow rate at an output of a compressor of the turbocharger, and so forth. Other variables may also be monitored, for example, if the turbocharger includes a VNT, a duty cycle that controls a vane position of the VNT may also be acquired.

The data acquired may be analyzed at step 406 against input and output conditions of the turbocharger. The analysis may be performed by plotting data points on a graph. The graph may include an input parameter on a horizontal axis versus one or more other input or output parameters on a vertical axis or axes. Each test condition may generate one or more points on the graph that represent input or output conditions. For example, if a turbocharger is being tested on an engine, as described above, the horizontal axis of the graph may represent a fuel consumption rate of the engine, and a vertical axis may represent both a compressor outlet pressure and a VNT duty cycle. Points plotted for VNT duty cycle versus engine fuel consumption may represent an input condition for the turbocharger, while a compressor outlet pressure versus fuel consumption may represent an output condition.

Part of the analysis of the data at step 406 may include a determination of acceptability of the data at step 408, for example, by comparing at least one input parameter with a range of values that are specific to the test condition and constitute an acceptable range of inputs for the test. When the data acquired at step 404 is deemed acceptable at step 408, a turbocharger is qualified and a pass or fail determination is made at step 410. The qualification of the turbocharger at step 410 is made by comparing at least one output value to an acceptable range of output values. If the output value of the turbocharger test falls within the acceptable range, the turbocharger is deemed to have passed the test successfully at step 412 otherwise, the turbocharger may be rejected at step 414 for having failed the test.

Analytical methods for qualifying turbochargers may be applied, for example, in a manufacturing environment as a product quality monitoring measure. Graphical methods may be applied, for example, in a development environment. A flowchart for an analytical application of a method of qualifying turbochargers, arranged specifically for turbocharger qualification in a manufacturing environment, is shown in FIG. 5. A turbocharger is received from an assembly process at step 502. The turbocharger may be a complete unit, or may alternatively be a partially built unit that is built with enough components to be functional but not finally assembled and trimmed. The turbocharger may be attached to a test stand at step 504.

The test stand may include an electronic controller, or microcontroller, that is associated therewith, and appropriate hardware that is capable of retaining the turbocharger and sealing some or all of its fluid passages. The test stand may also be connected to an air, gas or another fluid pump that is arranged to generate a flow of fluid or air and route it to an inlet of the turbocharger turbine causing a turbine wheel to rotate at step 506. Various sensors may be associated with the test stand that are arranged to measure various parameters, for example, inlet and pressure, temperature, and/or flow rate of the turbine and compressor, shaft rotational speed, and so forth. These parameters may be acquired with sensors and relayed to an electronic controller, at step 508. The electronic controller may analyze the parameters and calculate turbocharger specific parameters, such as, turbine or compressor efficiency.

Some of the parameters, for example compressor outlet pressure, may be compared to acceptable value ranges at step 510, and a determination of acceptability for the turbocharger may be made in the electronic controller at step 512. A notification may be sent to a display or to another controller associated with the assembly process to either accept the turbocharger that has just been tested, or reject it and either scrap it or send it for rework based on the determination, at step 514.

Figure 6:
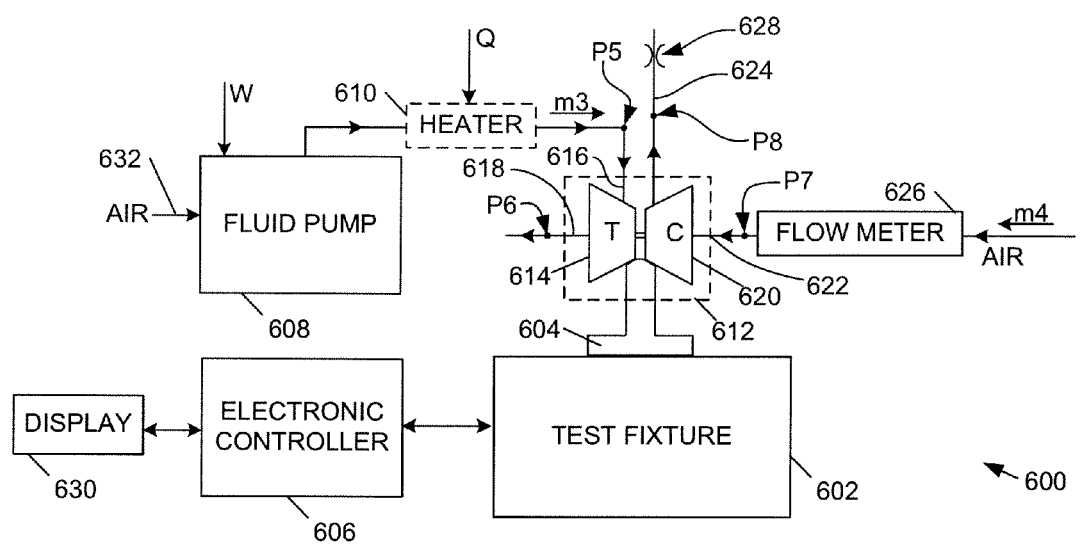
FIG. 6 is a block diagram of a test station for testing and qualifying turbocharger performance in accordance with the invention.

A block diagram of a test station 600, arranged and constructed to qualify turbocharger performance, is shown in FIG. 6. The test station 600 may include a fixture 602, an appropriate turbocharger mounting apparatus 604, an electronic controller 606 associated therewith, and a fluid pump 608 that may be connected to an optional heater 610. A turbocharger 612 is shown connected to the test station 600 for purposes of illustration. The turbocharger 612 has a turbine 614 having an inlet passage 616 and an outlet passage 618, and a compressor 620 having an inlet passage 622 and an outlet passage 624. The configuration shown in FIG. 6 is one potential configuration of the test station 600 during testing of the turbocharger 612.

For testing of the turbocharger 612, for example when the turbocharger 612 comes off an assembly line for end-of-line testing and/or quality control, the turbocharger 612 may be connected to the test fixture 602 through the mounting apparatus 604. The fluid pump 608 may be connected to the inlet passage 616 of the turbine 614. The optional heater 610 may also be in fluid communication with the inlet passage 616 and connected between the turbine 614 and the fluid pump 608. The outlet passage 618 may be open to environment or vented to ambient. The inlet passage 622 of the compressor 620 may be fluidly connected to a source of filtered air, and may contain a flow meter device 626. The outlet passage 624 of the compressor 620 may be open to ambient, or may optionally be connected (connection not shown) to a fluid or air inlet 632 of the fluid pump 608. The outlet passage 624 may also contain a flow orifice 628.

A work input, W, to activate and operate the fluid pump 606 may initiate the test after the turbocharger 612 has been connected to the test fixture 602. The pump 608 may supply a flow of air having a flow rate, m3, at a pressure, P5, to the inlet passage 616 to operate the turbine 614. The flow of air in the inlet passage 616 may optionally be heated in the heater 610 that operates by a heat input, Q. The heater 610 may be an electric heater, or may alternatively be a gas-fired heater having a heat exchanger therein that is arranged to heat the air passing therethrough. The turbine 614 may generate a work to operate the compressor 620 during the test by extracting energy from the air in the inlet passage 616, and exhaust the air from the passage 618 at a pressure, P6, which may be an ambient pressure or, alternatively, a vacuum in the case where optionally the outlet passage 618 is connected to a source of vacuum or the inlet of the fluid pump 608.

The compressor 620, while operated by the turbine 614, may draw in a flow of air at a flow rate, m4, and a pressure, P7, through the inlet passage 622 thereof. The flow rate m4 may be measured by the flow meter 626 and monitored during the test. The compressor 620 may compress the air from the pressure P7 to an outlet pressure, P8, present in the outlet passage 624 during the test. The flow orifice 628 may advantageously be used in the outlet passage 624 to create a restriction therein. The outlet pressure P7 may be an ambient pressure or, alternatively, a vacuum in the case where optionally the outlet passage 624 is connected to a source of vacuum or the inlet of the fluid pump 608.

A reading from the flow meter 626, along with other readings of pressure sensors arranged to measure the pressures P5, P6, P7, and P8 may be communicated to the electronic controller 606 for analysis, calculations, and/or processing. The results of the test of the turbocharger 612, along with a determination of acceptability of the test or any other notifications may be relayed from the electronic controller to a display 630 that may notify an operator or another electronic device of any pertinent information about the turbocharger or the test. For example, a notification that the turbocharger 612 is acceptable and has passed the test may be relayed, a notification that the turbocharger 612 failed the test, or a notification to repeat the test, may be sent.

The test fixture 602 may be used to qualify an entire turbocharger unit, or individual components thereof. When, for example, qualification of the performance of the turbocharger 612 is desired, the mass flow m4 along with the pressures P7 and P8 may be acquired, and plotted on a compressor map versus an energy input to the turbine 614, or more advantageously, an enthalpy of the air in the inlet passage 616 that will depend on the work input W plus the heat input Q if the heater 610 is used and active during the test. Typically, data for each turbocharger tested may be overlaid onto a turbine or compressor map and compared to a nominal, as described above.

The embodiments described herein are advantageous in that a process is provided for qualifying turbocharger units and components by testing the same under fewer than before operating conditions, typically one or two, on either an engine or a gas stand. By using two data points, for example, assessment of turbocharger performance at both low and high speed and load conditions are represented. Results form these two data points may advantageously determine a pass or fail determination for adequate turbocharger performance. Two data points appear to provide adequate information for a broad range of operation, but narrower operating range investigations may be adequately attained by a single data point.

One advantage that may be realized by use of the embodiments described herein is the ability to statistically qualify the performance of groups of turbocharger units, for example, turbocharger units belonging to a production run, or a prototype batch, and so forth. This statistical analysis may be used to diagnose groups of turbochargers, or even create parameters pertaining to the performance of these turbochargers for use as functional specifications.

Figure 7:
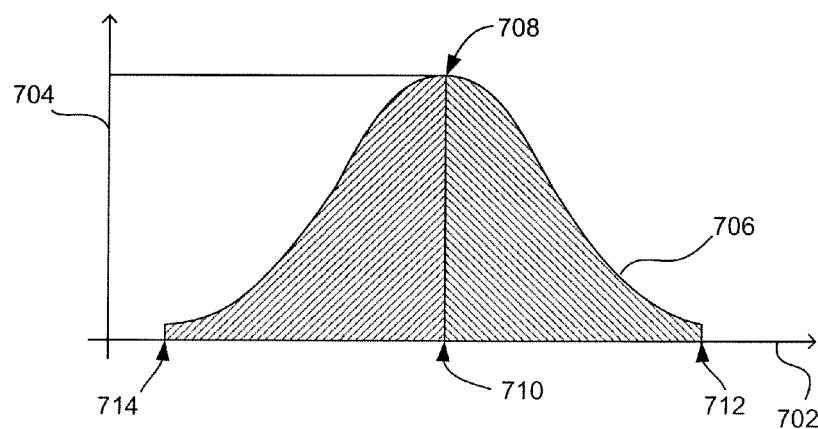
FIG. 7 is a graph for a distribution used to qualify turbocharger performance in accordance with the invention.

A distribution curve of a group of turbochargers is shown in FIG. 7. A group of turbocharger units may be run at a single test condition, and an output metric value may be recorded. The information recorded for the group of turbocharger units may be accumulated in the graph of FIG. 7, which represents a value for the output metric along a horizontal axis 702. A number or percentage of turbocharger units exhibiting performance within an increment of the scale of the horizontal axis 702 is displayed on a vertical axis 704. A curve 706 may be created that may show the distribution of turbocharger performance. A peak point 708 of the curve 706 may represent a nominal value 710 on the horizontal axis for the output metric. Moreover, a maximum value 712 and a minimum value 714 may also be defined for the output metric. The distribution shown in FIG. 7 has a shape of a normal distribution, but other distributions may also arise. The maximum limit 712 and minimum limit 714 may be subsequently used to either define acceptance criteria of turbochargers not belonging to the group of turbocharger units tested.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for qualifying turbocharger performance, comprising the steps of:

operating a turbocharger at a test condition;
acquiring a set of date from a set of operating parameters of the turbocharger at the test condition;
comparing the set of data to a set of acceptable operating ranges;
determining whether the set of data falls within the acceptable operating ranges; qualifying the turbocharger based on an outcome of the determination;
wherein the determination step further includes the steps of:
plotting the set of data on a graph;
defining a rectangular area on the graph to represent the acceptable operating ranges; and
determining whether data points on the graph fall within the rectangular area on the graph.

2. The method of qualifying turbocharger performance of claim 1, wherein the step of operating the turbocharger at the test condition is accomplished by operating the turbocharger on a test fixture.

3. A method of testing turbochargers, comprising the steps of:

operating a turbocharger at a test condition as part of an engine system;
monitoring a set of inputs to the system that includes a fuel consumption rate of the engine system;
monitoring a set of outputs from the system that includes a compressor outlet pressure of the turbocharger;
comparing the set of outputs to a set of respective acceptable ranges;
finding a performance of the turbocharger acceptable at times when the set of outputs is within the set of respective acceptable ranges.

4. The method of claim 3, further comprising the step of plotting a set of points representing the set of inputs and the set of outputs on a graph, wherein the graph includes a horizontal axis that represents one of the set of inputs, wherein the graph includes at feast one vertical axis that represents at least one of the set of outputs, wherein the test condition is represented by at least one point on the graph, wherein at least one of the set of acceptable ranges is represented by an area on the graph, and wherein the finding of acceptable turbocharger performance occurs when the at least one point is within the area on the graph.

5. The method of claim 3, wherein the set of inputs includes measurable parameters and derivative parameters of operation of the engine system, wherein measurable values are selected from the group comprising turbine inlet gas temperature, turbine inlet gas pressure, turbine inlet gas flow rate, compressor inlet air temperature, compressor inlet air pressure, compressor inlet air flow rate, engine fueling rate, engine speed, VNT duty cycle, and turbine shaft speed, and wherein derivative parameters are selected from the group comprising turbine inlet gas enthalpy and compressor inlet air enthalpy.

6. A test station for qualifying turbocharger performance, comprising:

a test fixture having a turbocharger mounting apparatus attached thereon;
an electronic controller associated therewith;
a plurality of sensors that are disposed to measure operating parameters of the test station and are operably connected to the test station;
a fluid pump arranged and constructed to fluidly connect to a turbocharger at times when the turbocharger is connected to the test fixture with the mounting apparatus, such that a fluid pump outlet is connected to a turbine inlet passage.

7. The test station of claim 6, further comprising a flow meter device fluidly connected to a compressor inlet passage, wherein the compressor inlet passage is arranged to connect to an inlet of a compressor of the turbocharger.

8. The test station of claim 6, further comprising at least one of:
- a first pressure sensor arranged to measure an air pressure in the turbine inlet passage;
- a second pressure sensor arranged to measure an air pressure in a turbine outlet passage;
- a third pressure sensor arranged to measure an air pressure in the compressor inlet passage; and
- a fourth pressure sensor that is arranged to measure an air pressure in a compressor outlet passage;
- wherein at least one of the first pressure sensor, the second pressure sensor, the third pressure sensor and the fourth pressure sensor is connected to the electronic controller.

9. The test station of claim 6, further comprising a heater disposed in the turbine inlet passage between the fluid pump and the turbocharger.

10. The test station of claim 6, further comprising an orifice disposed in the compressor outlet passage.

11. The test station of claim 6, further comprising a display operably associated with the electronic controller.

12. The test station of claim 6, further comprising a turbocharger, wherein the turbocharger includes a turbine having a turbine inlet and a turbine outlet, a compressor having a compressor inlet and a compressor outlet, wherein the turbine inlet is fluidly connected to the turbine inlet passage, wherein the compressor inlet is fluidly connected with the compressor inlet passage, and wherein the compressor outlet is fluidly connected to the compressor outlet passage.

* * * * *